May 8, 1956 J. LOMBARD ET AL 2,744,977
ELECTRIC SIGNALIZING PRESSURE SENSITIVE INDICATOR
Filed Jan. 9, 1951

INVENTORS
JEAN LOMBARD
JEAN MAZOYER
BY Robert Burns
ATTORNEY

United States Patent Office 2,744,977
Patented May 8, 1956

---

2,744,977

ELECTRIC SIGNALIZING PRESSURE SENSITIVE INDICATOR

Jean Lombard, Boulogne, and Jean Mazoyer, Levallois, France, assignors to Ateliers Seignol, Neuilly-sur-Seine, France, a corporation of France Application January 9, 1951, Serial No. 205,080

Claims priority, application France January 11, 1950

3 Claims. (Cl. 200—83)

Several types of electric indicators are already known, which give a signal when the pressure of a fluid reaches a predetermined value, wherein a souple and elastic membrane, subject to the pressure of a fluid, causes the opening or closing of a signalizing circuit. In such indicating devices, the membrane becomes greatly deformed when the pressure reaches a value largely higher than a predetermined maximum pressure, whereby under certain conditions said membrane takes a permanent set which prevents its further normal operation.

The present invention, which avoids such permanent deformations of the membrane, has for its object an improved fluid pressure responsive switching means adapted to give a signal or otherwise indicate when the pressure of a fluid runs past a predetermined value, wherein a souple and elastic membrane, impervious to the fluid the pressure of which is to be controlled, is secured to the periphery of a wall the surface of which is plane or has a very small curvature. Said membrane co-operates with means through which said membrane is in contact with the fluid under pressure by the face opposed to that which faces said wall, while preventing any leaking of fluid between said wall and said membrane. Said wall is stationary, i. e. normally resists without substantial deformation to the pressure of a fluid but over a region covering a fraction thereof which is occupied at least by one retractible rigid element permanently subject to an adjustable effort applied in a direction opposed to the direction of the resultant of the pressures exerted upon said element by the fluid, such opposing effort being so adjusted that, when the aforesaid pressure falls below the predetermined value, said retractible element projects above the stationary portion of said wall and, when said pressure is higher than said predetermined value, the outside of said element comes flush with said stationary portion, said element taking a firm stand against abutting means, whereby the membrane is not deformed any further but only takes then exactly the plane or slightly curved shape of said wall. The said retractible element co-operates with means adapted to close a signalizing circuit when said element pushes on the membrane, and to close the said circuit when said element is in its withdrawn position, while resting on its abutting means. Thus, the membrane is only subjected to predetermined sufficiently limited efforts and, therefore, never reaches a state of detrimental permanent deformation.

Other features of the present invention will appear from the following description. By way of a non-limitative example, and with reference to the appended drawings, an embodiment of the invention is hereinafter described.

Figure 1:
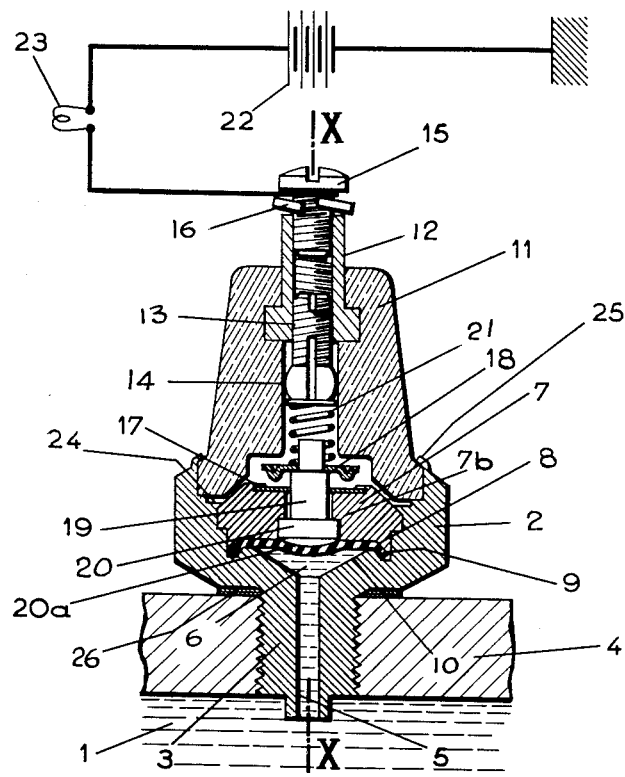
Fig. 1 is an axial section of a fluid pressure responsive switching means according to the invention and an electric circuit associated with said switching means.
Figure 2:
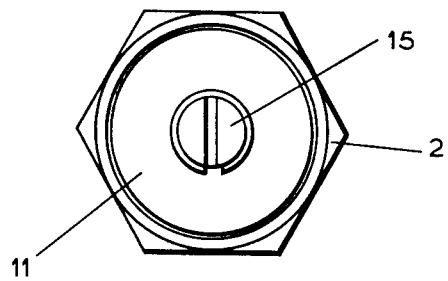
Fig. 2 is a plane view of the same.

The fluid pressure responsive switching means shown in Figs. 1 and 2, intended to control the pressure of the oil contained in the tank 1, assumes externally the outline of a sparking plug. A metallic base 2 with axis X—X comprises a threaded tail portion 3 screwed into the wall 4 of the said tank. The tail portion 3 includes a central passage 5 through which the oil contained in the tank 1 may reach a chamber 6 provided inside of said base, one end of said chamber being constituted by a part 7, of circular cross-section, coaxial with said axis X—X and made of a conducting material.

Against the lower face 8 of said part 7 is located a round membrane 9 made of rubber, which is gripped about its periphery between such chamber end 7 and the sides of said chamber 6, said sides being constituted by a frustroconical flared portion 10 of the central passage 5. The part 7, tailed in the central portion of the base 2, is surrounded by a hollow moulding 11 made of insulating material and tailed into the upper edge portion of the base 2. At the end of said moulding 11 which is opposed to the metallic base 2, a metallic flanged sleeve 12, threaded throughout internally, is tailed in the body 11 during the moulding process thereof. In the tailed end of said sleeve 12 is screwed a headless screw 13, the lower end of which is cut open in order to yieldingly rest upon the wall of a central passage 14 of said moulding 11. In the projecting end of the sleeve 12 is screwed a fillister screw 15. Said screw 15, together with the elastic washer 16 and the sleeve 12, forms one of the terminals of a switch mounted inside of the base 2, the other terminal of which being constituted by the said base itself, which is electrically connected to the wall 4, which is the earthed part of the device. One contact piece 17 of said switch is secured at the upper portion of the aforesaid part 7, by a means not shown. Its other contact piece 18 is integral with an element 19, which slides into the part 7, is coaxial with said part 7 and is provided at its lower end with an enlarged portion 20. The lower face 20a of said enlarged portion 20 is slightly convex. Said element 19 is constantly exposed to the pressure of a helical spring 21, located between the lower end 14 of the screw 13 and the contact piece 18. When the oil pressure in chamber 6 is lower than the predetermined maximum pressure, the slide 19 projects inside of said chamber so that the membrane 9 takes a convex shape. In this position, the contact piece 18 rests on the contact piece 17, whereby closing the circuit of the source of electric energy 22, which is connected to the screw 15 through the intermediary of a signal lamp 23. When the oil pressure becomes slightly higher than the predetermined maximum pressure, the slide 19 is repulsed towards the screw 13 and its enlarged portion 20 comes to rest on the corresponding abutting portion 7b provided on the part 7. In the latter position, the general outline of the lower face 8 of part 7 is slightly convex and remains so, whatever the value of the oil pressure above the predetermined maximum may be; thus, the elastic membrane 9 cannot take any detrimental permanent deformation. When the slide 19 withdraws inside of the part 7, the contact pieces 17 and 18 are separated from each other, the aforesaid lamp 22—23 being switched off thereby.

The pressure of the helical spring 21 may be adjusted by means of the screw 13 depending on the predetermined maximum for the oil pressure. Oil leaks outside of the tank through the above described pressure indicating device cannot take place, since the part 7 has been tailed into the base 2 by turning the edge 24 over a frustroconical lateral face provided on said part 7, as shown on the drawing. The seal thus obtained is reinforced by tailing the insulating hollow body 11 into the base 2 by turning over a similarly frustroconical face of said body 11, the circular edge portion 25 of the said base 2.

Adjacent the beginning of the threaded portion 3 of the metallic base 2 is a shouldered portion against which rests a metallic joint 26 for providing a seal between the base and the tank as well as insuring the electrical connection between said base and the earth.

Obviously, the present invention is not limited to the embodiment above described and shown on the drawing. Particularly, the supporting face 8 for the elastic membrane may be slightly curved instead of being a plane surface. Similarly, the slide 19, located in the center portion of part 7, may be replaced by an annular sliding part carrying one of the contact pieces of the signalization switch.

The device according to the invention may be utilized not only to control the oil pressure, but also the pressure of any fluid under pressure, being provided that the temperature of said fluid is compatible with the preservation of the properties of the elastic membrane in contact therewith.

What we claim is:

1. In a fluid pressure responsive switching means, comprising a base member adapted to be mounted on a pressure tank and providing an inner chamber in sealed communication with said pressure tank, a top body member secured to said base member and providing an axial bore inwardly extending into a passage adjacent to said inner chamber, an elastic membrane secured within said base member and constituting outwardly a sealed transversal closure for said inner chamber, a conducting transversal wall member secured within said base member and having a central aperture terminating the inner end of said passage, an insulating motion transmitting member axially movable within said passage and aperture and operatively engaging said membrane, yielding means within said axial bore for constantly exerting an adjustable axially and inwardly directed effort on the outer end of said motion transmitting member, stationary contact means on said transversal wall member, and movable contact means mounted on and movable with said motion transmitting member for operatively cooperating with said stationary contact means, the provision of safety abutting means for positively and independently from the adjustment of said yielding means limiting the outward stroke of said motion transmitting member just sufficiently to bring the innermost exposed portion of same adjacent said wall member substantially flush with the inwardly exposed surface of said wall member.

2. In a fluid pressure responsive switching means according to claim 1, whereby the abutting means comprises firstly a downwardly and laterally extending axial cylindrical recess formed by said aperture within said wall member, having a diameter substantially greater than the inner end of said passage and forming a transverse abutting face adjacent said inner end of said passage, and, secondly, an enlarged head portion formed at the innermost end of said motion transmitting member engaging said membrane and comprising a transverse abutting face on the back side of said head portion, both said abutting faces mating in form and position for positively and independently from the adjustment of said yielding means limiting the outward stroke of said motion transmitting member just sufficiently to bring the innermost exposed portion of same engaging said membrane substantially flush with the adjacent inwardly exposed surface of said wall member.

3. A fluid pressure responsive switch comprising an electrically conducting base member adapted to be mounted on a pressure tank and providing an inner chamber in sealed communication with said pressure tank; an insulating top body member secured to said base member and providing an axial bore inwardly extending into a passage adjacent to said inner chamber; a conducting transversal wall member secured within said conducting base member, having a central recess terminating in the inner end of said passage and the diameter of which is substantially greater than said passage; an elastic membrane peripherally secured between said base and wall members and constituting outwardly a sealed transversal closure for said inner chamber; an insulating motion transmitting member axially movable within said passage and recess and comprising three portions, namely: an intermediate stem portion freely movable within said passage, an innermost enlarged head portion slidingly fitting within said recess and the exposed face of which has at the most a slight convexity and an outermost spring guiding tail portion; a compression spring member axially mounted within said bore; a longitudinally adjustable abutting device mounted in said top body member and cooperating with said spring member at the outer end thereof; a conducting ring member fitting said tail portion at the base thereof and bearing against the back face of said intermediate stem portion, said spring member compressingly bearing at its inner end against said conducting ring member, internally slidingly fitting said tail portion and externally slidingly fitting said bore; a stationary contact member on said transversal wall member, downwardly projecting portions being formed on said conducting ring member and facing said stationary contact member for operatively cooperating therewith, the longitudinal dimension of said sliding fit between said head portion and recess being at the most equal to the longitudinal dimension of said head portion as measured at the lateral periphery of said exposed face thereof.

References Cited in the file of this patent
UNITED STATES PATENTS

| | | |
|---|---|---|
| 708,155 | Meloon | Sept. 2, 1902 |
| 841,186 | Sandvoss | Jan. 15, 1907 |
| 1,172,199 | Dana et al. | Feb. 15, 1916 |
| 1,231,561 | Briggs | July 3, 1917 |
| 1,573,371 | Block | Feb. 16, 1926 |
| 1,951,245 | Jardine | Mar. 13, 1934 |
| 2,069,222 | Cremer | Feb. 2, 1937 |
| 2,321,631 | Sibal | June 15, 1943 |
| 2,332,301 | Cox | Oct. 19, 1943 |